United States Patent
Hall

[11] Patent Number: 6,003,819
[45] Date of Patent: Dec. 21, 1999

[54] PIVOTING AND TELECOPING HOSE SUPPORT

[76] Inventor: Carl L. Hall, 630 Abney, Waskom, Tex. 75692

[21] Appl. No.: 09/001,154

[22] Filed: Dec. 30, 1997

[51] Int. Cl.[6] .................................................. A62C 13/76
[52] U.S. Cl. ................................ 248/49; 248/75; 248/80
[58] Field of Search ................................ 248/49, 75, 80, 248/83; 138/106, 110

[56] References Cited

U.S. PATENT DOCUMENTS

| | | | |
|---|---|---|---|
| 1,414,834 | 5/1922 | Souter | 248/75 |
| 3,165,286 | 1/1965 | Johnson et al. | 248/75 |
| 3,406,933 | 10/1968 | Wait et al. | 248/80 |
| 3,819,137 | 6/1974 | Smith | 248/49 |
| 4,169,571 | 10/1979 | Duggan | 248/49 |
| 4,194,711 | 3/1980 | Winton | 248/49 |
| 4,228,978 | 10/1980 | Rand | 248/75 X |
| 4,403,758 | 9/1983 | Burt | 248/49 |
| 4,406,434 | 9/1983 | Schneckloth | 248/83 |
| 4,712,755 | 12/1987 | Robbins et al. | 248/80 X |
| 4,715,570 | 12/1987 | Mashuda | 248/49 |
| 4,905,939 | 3/1990 | Horn | 248/75 X |
| 5,033,702 | 7/1991 | Robbins | 248/83 |
| 5,067,679 | 11/1991 | Courtney | 248/75 |
| 5,788,193 | 8/1998 | Hilbert | 248/80 |

*Primary Examiner*—Derek J. Berger
*Attorney, Agent, or Firm*—John M. Harrison

[57] ABSTRACT

A pivoting and telescoping or slidably-adjustable hose support, typically for draining the holding tanks of recreational vehicles, includes a length of cross-sectionally curved, slidably-adjustable, trough-like support segments fitted with pivoting legs of the same cross-section, which legs may be of the same or dissimilar length. In a preferred embodiment the receiving support segment is characterized by longitudinal edge rails shaped to define rail slots that receive the upper longitudinal edges of the telescoping support segment, to impart strength to the hose support. Furthermore, the pivoting legs are typically constructed of segments of the receiving support segment and are typically pivotally attached to the sides or walls of the receiving and telescoping support segments by means of brads or pins. Accordingly, the pivoting legs are designed to selectively pivotally extend to carry the hose support and pivot in folding configuration to nest against the curved surfaces of the respective receiving support segment and telescoping support segment and facilitate easy storage of the hose support in a recreational vehicle or other location.

16 Claims, 2 Drawing Sheets

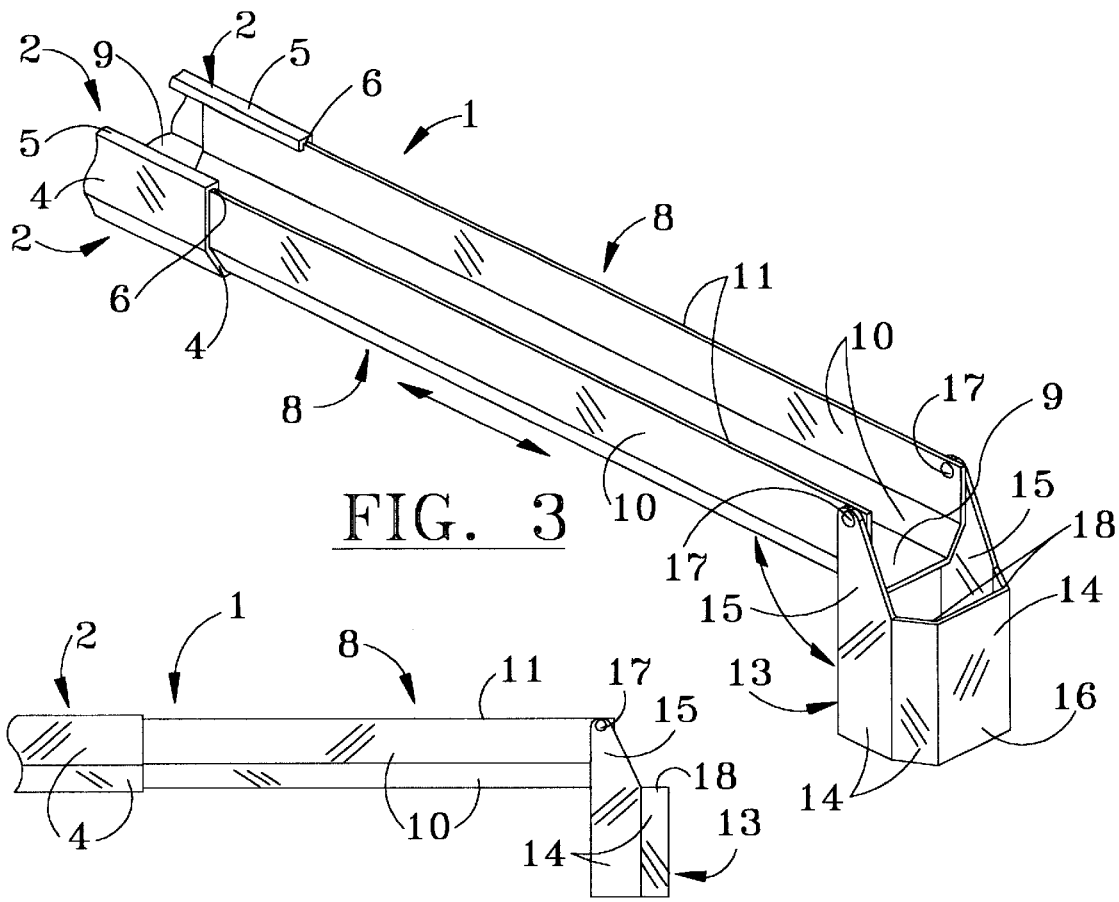
FIG. 3
FIG. 4
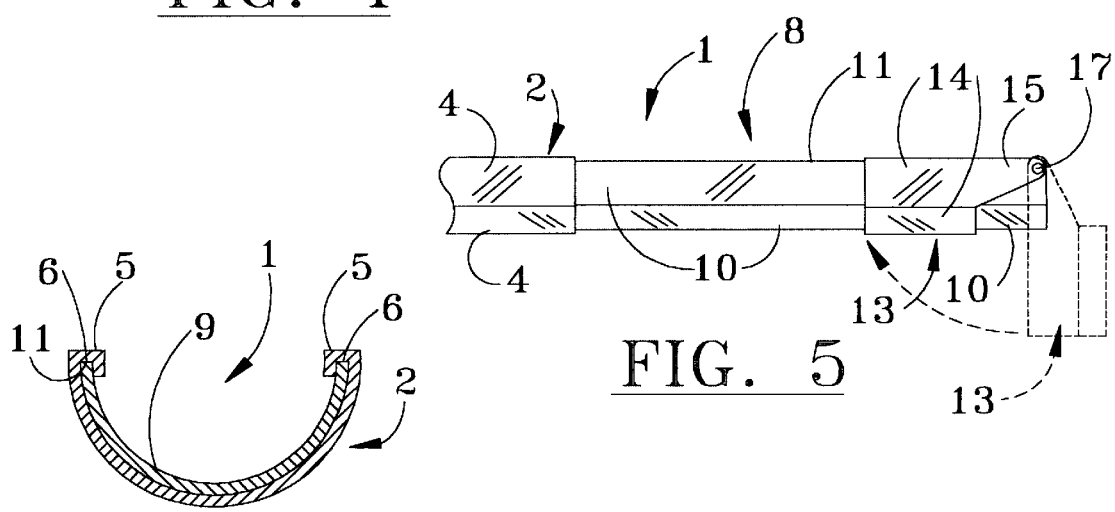
FIG. 6
FIG. 5

PIVOTING AND TELECOPING HOSE SUPPORT

BACKGROUND OF THE INVENTION

1. Field of the Invention

This invention relates to hose or conduit cradles and supports and more particularly, to a pivoting and telescoping hose or conduit support which is primarily designed for supporting drain hoses extending from the holding tanks of recreational vehicles. One of the problems often encountered by owners of recreational vehicles in the course of draining holding tanks is the uneven terrain, making deployment of the drain hose, once attached to the holding tank of a recreational vehicle, difficult to extend into the proper drainage area. For example, if an area or length of high ground extends between the point of drainage and the end of the drain hose, flowage from the holding tank is frequently terminated or slowed because of the unevenness of the terrain.

Recreational vehicles, including motor homes, house trailers, campers, and like vehicles, are conventionally equipped with toilet, shower, sink, lavatory and other facilities, from which waste water and other material must be periodically discharged. This discharge is usually connected to a storage or holding tank which is periodically emptied at trailer parks and other locations, as deemed necessary. In order to facilitate the continuous gravity drainage of the holding tank through a drain hose, the hose is ideally laid out on at least level, and preferably inclined, terrain with no intermediate hills or rises to impede the drainage of the water from the holding tank.

2. Description of the Prior Art

Various devices have been designed to support drainage hoses, and particularly hoses designed to drain the holding or storage tank of recreational vehicles. Typical of these devices is the "Trestle For A Flexible Hose", detailed in U.S. Pat. No. 3,819,137, dated Jun. 25, 1974. The device includes a hose support trestle having a ladder with pivotal rungs, thus enabling the ladder to collapse by moving the pole portions of the ladder together. An adjusting mechanism is provided for elevating the ladder at one or both ends. The whole assembly is adapted to be stored when not in use within the flexible hose which the device supports. U.S. Pat. No. 4,169,571, dated Oct. 2, 1979, to William G. Duggan, details "Hose Cradles" which include a trough, to each end of which a pair of legs is pivotally connected in a manner such that the legs may be swung from the vertical position to the outwardly-swung, horizontal positions or to inwardly-swung, overlapping positions. A "Flexible Sewer Line Support" is detailed in U.S. Pat. No. 4,194,711, dated Mar. 25, 1980, to Leroy Winton. The structure includes a series of interconnected troughs provided with fastening devices for attaching individual trough lengths and one or more stands may be attached to the troughs for support purposes. U.S. Pat. No. 4,403,758, dated Sep. 13, 1983, to Howard N. M. Burt, details a "Waste Pipe Support Apparatus". The apparatus includes two nested, trough-type, semi-cylindrical tubular members which telescope or slide relative to each other. The device is provided with a bail-type support leg structure which elevates one end of the apparatus. U.S. Pat. No. 4,406,434, dated Sep. 27, 1983, to R. C. Schneckloth, details a "Recreational Vehicle Drain Support". The drain support includes a trough made of rigid sections, wherein pairs of supporting members are tied together by a resilient mechanism to provide an upper diverging clamping portion and a lower pair of diverging legs. The upper clamping portion securely fastens legs to the trough. A "Foldable Drain Hose Support" is detailed in U.S. Pat. No. 4,715,570, dated Dec. 29, 1987, to David Mashuda. The device includes a trestle-like, flexible drain conduit formed of four or more stretcher sections connected end-to-end by hinge sections. The stretcher sections each include a pair of angled members with upright flanges spaced-apart at each end by a crosswise hinge member. The foldable trestle may be extended to support a drain hose or it may be collapsible by virtue of the folding relationship at the hinges, for storage purposes. U.S. Pat. No. 5,033,702, dated Jul. 23, 1991, to Daniel S. Robbins, details a "Hose Support For Waste Disposal Systems". The apparatus includes a trough-like support which may be provided in sections, supported by vertical members removably clamped to bottom edge portions of the support sections, in an inclined position from the outlet to the inlet. The vertical members are designed with horizontal, U-shaped clamping portions positioned with the end edges of the trough-like support clamped between the legs of the U. U.S. Pat. No. 5,067,679, dated Nov. 26, 1991, to Charles H. Courtney, details a "Flexible Waste Hose Support For Recreational Vehicles". The hose support includes a telescoping, trough-like support, one end of which is fitted with a ring for attaching to a bracket in the recreational vehicle fender well and the other end extending outwardly to support the hose for drainage purposes.

It is an object of this invention to provide a pivoting and telescoping or slidably-disposed hose or conduit support which includes a pair of channel-shaped, pivoting leg portions of corresponding cross-section, that may be deployed in supporting configuration to support a hose or conduit, or in folded configuration to facilitate storage of the hose support.

Another object of this invention is to provide a new and improved pivoting and telescoping hose support which is characterized by a pair of telescoping or slidably engaged, trough-like segments, the receiving support segment of which has longitudinal edge rails for engagement by the longitudinal edges of the telescoping or entering support segment, and the segments each receiving a pivoting leg shaped substantially in the cross-sectional configuration of the telescoping segment. The legs are pivoted downwardly to support the segments when the support is in extended, functional configuration and upwardly in nested configuration against the support segments, respectively, when the support is in telescoped, stored configuration.

Yet another object of this invention is to provide a pivoting leg and slidably-engaging segment hose support for supporting the drainage hose of a recreation vehicle, which hose support includes a pair of channeled-shaped trough members, one of which slidably engages in the other and both of which are fitted with pivotally-mounted leg portions, each leg portion having a cross-section substantially the same as the telescoping support member, to facilitate downward deployment of the legs when the support members are positioned in functional, extended configuration to support a hose or conduit, and pivoting of the legs against the telescoped support members, respectively, in nested configuration, for storage.

SUMMARY OF THE INVENTION

These and other objects of the invention are provided in a new and improved, pivoting and telescoping hose support which is characterized in a preferred embodiment by a pair of trough-like, telescoping support segments, the receiving support segment of which is fitted with rails and downwardly-extending rail slots provided along the parallel longitudinal top edges thereof for receiving the corresponding longitudinal top edges of the telescoping support segment. A pair of legs of the same or dissimilar length and each having a cross-section substantially the same as the telescoping or inwardly-extending support segment, are pivotally attached to the extending ends of the support segments, respectively. This design facilitates support of a drain hose or conduit by the support segments when the support segments are extended and the legs are pivoted downwardly to compensate for uneven terrain, and storage of the support segments when the support segments are telescoped or slidably adjusted inwardly and the legs are pivoted into nested configuration against the curved ends of the support segments, respectively.

BRIEF DESCRIPTION OF THE DRAWINGS

The invention will be better understood by reference to the accompanying drawing, wherein:

FIG. 3 is a perspective view, partially in section, of the telescoping or entering support segment end of the hose support illustrated in FIG. 1, more particularly illustrating a typical pivoting attachment of a pivoting leg to the extending end of the telescoping support segment;

FIG. 4 is a side view of the telescoping support segment illustrated in FIG. 3;

FIG. 5 is a side view of the telescoping support segment illustrated in FIG. 4, more particularly illustrating pivoting of the pivoting leg against the telescoping support segment in nested configuration for storage; and FIG. 6 is a sectional view of a second preferred embodiment of the hose support illustrated in FIGS. 1–5.

DESCRIPTION OF THE PREFERRED EMBODIMENTS

Figure 1:
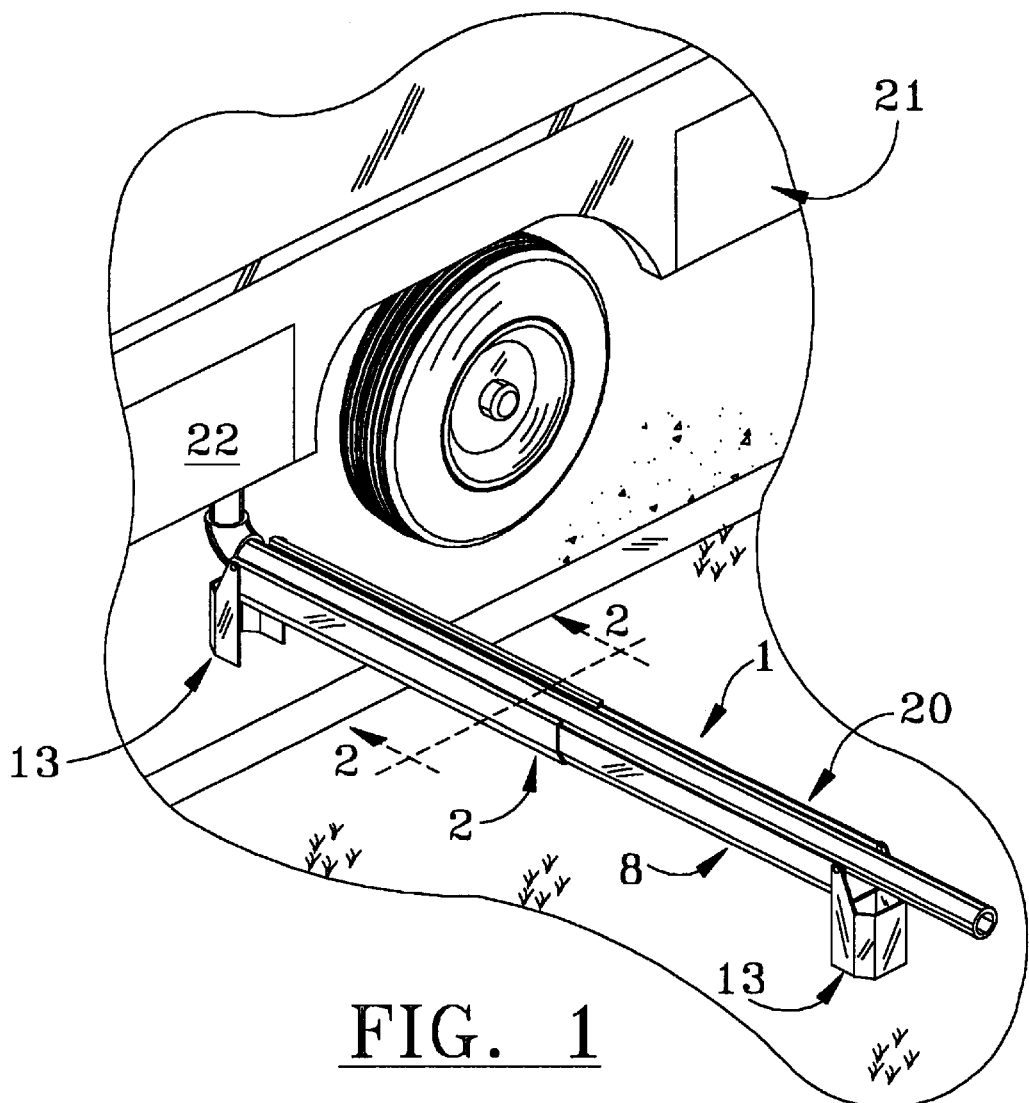
FIG. 1 is a perspective view of a preferred embodiment of the pivoting and telescoping hose support of this invention in functional configuration supporting a drainage hose or conduit extending from the holding tank of a recreational vehicle.

Referring initially to FIGS. 1–5 of the drawing, in a preferred embodiment the hose support of this invention is generally illustrated by reference numeral 1. The hose support 1 is characterized by a generally trough-like receiving support segment 2, typically having a receiving support segment bottom 3 and stepped receiving support segment sides 4, the top support segment side 4 of which is shaped to define a receiving support segment rail 5. The receiving support segment rail 5 is configured to define downwardly-directed, longitudinal, parallel rail slots 6 for receiving corresponding longitudinal, parallel telescoping support segment edges 11 of the top stepped telescoping support segment sides 10 of a telescoping or entering support segment 8. The telescoping support segment sides 10 join longitudinally at a telescoping support segment bottom 9 and it will be apparent from a consideration of FIG. 2 of the drawings, that the telescoping support segment 8 is shaped in the same cross-sectional configuration as the receiving support segment 2, without the rails 5. Accordingly, when positioned in telescoping or slidably-disposed configuration inside the receiving support segment 2, the telescoping support segment 8 is deployed with the telescoping support segment edges 11 engaging the corresponding rail slots 6 in the receiving support segment rails 5, as further illustrated in FIGS. 2 and 3.

Figure 2:
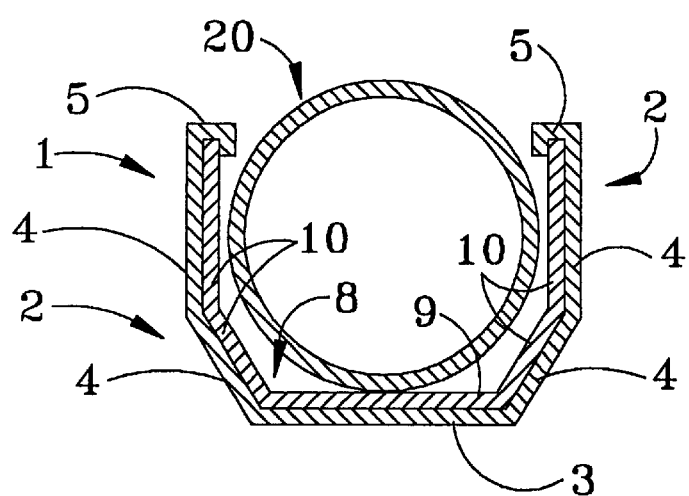
FIG. 2 is a sectional view, taken along line 2—2 of the hose support and hose illustrated in FIG. 1.

Referring now to FIGS. 1 and 3–5, both the receiving support segment 2 and the telescoping or entering support segment 8 are provided with a pivoting leg 13, each of which is cut and shaped from the same material used to construct the telescoping support segment 8, but with projecting side flanges 15 shaped in the corresponding top ones of the leg sides 14 by means of the corresponding leg notches 18, for receiving the leg pivot pins 17 and connecting the pivoting legs 13 to the ends of the receiving support segment 2 and the telescoping support segment 8, respectively. As in the case of the receiving support segment 2 and telescoping support segment 8, a leg bottom 16 joins the stepped leg sides 14 in the pivoting legs 13 and because the cross-sectional configuration of each of the pivoting legs 13 is the same as the cross-sectional configuration of the telescoping support segment 8, the pivoting legs 13 are designed to pivot upwardly against the receiving support segment 2 and the telescoping support segment 8 in nesting configuration, as illustrated in FIG. 5. Downward deployment of the pivoting legs 13 on the respective side flanges 15 of the receiving support segment 2 and the telescoping support segment 8 as illustrated in FIGS. 1, 3 and 4 of the drawings, presents the hose support 1 in functional configuration to receive and support a drain conduit or hose 20, as illustrated in FIGS. 1 and 2. The conventional drain hose 20 may typically be used to drain the holding tank 22 of a recreational vehicle 21, as illustrated in FIG. 1, or for other purposes well known to those skilled in the art.

It will be appreciated by those skilled in the art that the lengths of the two pivoting legs 13 may be different or the same, as desired. For example, the pivoting leg 13 which is designed to pivot on the receiving support segment 2 may be sufficiently long to support the hose 20 in a secure configuration on the downspout or drain connector (not illustrated) of the recreational tank 21, as illustrated in FIG. 1. Furthermore, the pivoting leg 13 which is attached to the telescoping support segment 8 may be shorter, for example, under circumstances where the terrain extending between the recreational vehicle and the draining end of the hose 20 is level. This design facilitates an acceptable pitch or fall of the hose 20 while resting in the receiving support segment 2 and the telescoping support segment 8, and promotes proper drainage of liquid from the holding tank 22 of the recreational vehicle 21.

Referring again to FIG. 5 of the drawings, under circumstances where it is desired to store the hose support 1, the telescoping support segment 8 is longitudinally telescoped or slidably disposed into the receiving support segment 2 as the parallel telescoping support segment edges 11 of the former slide inside the corresponding rail slots 6 of the receiving support segment rails 5 of the latter. The respective pivoting legs 13 are then folded upwardly as indicated by the arrow in FIG. 5, from the position illustrated in phantom, to the folded and nested configuration, thus presenting a relatively short, compact support with minimal projections for storage in the bumper or other area of the recreational vehicle 21. It will be appreciated from a consideration of FIG. 5, that the telescoping support segment 8 can be slidably disposed into the receiving support segment 2 to the extent necessary to facilitate storage of the hose support 1. Full extension of the telescoping support segment 8 into the receiving support segment 2 facilitates pivoting and nesting of the pivoting leg 13 connected to the telescoping support segment 8, against the receiving support segment 2.

Referring now to FIG. 6 of the drawings, in another preferred embodiment of the invention the hose support 1 is characterized by a receiving support segment 2 and a telescoping or entering support segment 8 which are each constructed of half-cylinder, trough-like members, wherein the receiving support segment 2 is fitted with receiving support segment rails 5 having longitudinal rail slots 6, and the telescoping support segment edges 11 are received in the respective receiving support rails slots 6, as described above with respect to the hose support embodiment illustrated in FIGS. 1–5. It will be appreciated by those skilled in the art that in this embodiment of the hose support 1, the pivoting legs 13 may be constructed of the same half-cylinder or semi-circular cross-section as the receiving support segment 2 and the telescoping support segment 8 and may be connected to the ends of the receiving support segment 2 and telescoping support segment 8 by means of leg pivot pins 17, in the same manner as in hose support the embodiment illustrated in FIGS. 3–5 of the drawing.

It will be further appreciated by those skilled in the art that the receiving support segment 2, telescoping support segment 8 and the respective pivoting legs 13 of the hose support 1 can be constructed of any desired material, including metal, plastic, fiberglass and the like. However, in a most preferred embodiment the elements of the hose support 1 are constructed of a plastic material such as polyethylene, polypropylene, polyvinylchloride or like plastic material, because of the ease of extruding the receiving support segments 2 and telescoping support segments 8 and cutting the pivoting legs 13 and assembling the pivoting legs 13 on the respective receiving support segments 2 and telescoping support segments 8. Furthermore, the plastic hose support 1 is light in weight and is easy to deploy and clean.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A support for supporting a drain conduit or hose, comprising a generally trough-shaped, substantially semi-cylindrical first support segment having first longitudinal edges; rails provided on said first longitudinal edges of said first support segment and rail slots provided in said rails, respectively; a generally trough-shaped, substantially semi-cylindrical second support segment having second longitudinal edges disposed for slidably engaging said rail slots in said rails and selectively substantially slidably closing said second support segment inside said first support segment; a first generally trough-shaped, substantially semi-cylindrical leg pivotally connected to said first support segment for pivoting and nesting against said first support segment in folded configuration and pivotally extending from said first support segment in supporting configuration; and a second generally trough-shaped, substantially semi-cylindrical leg pivotally connected to said second support segment for pivoting and nesting against said second support segment in said folded configuration and pivotally extending from said second support segment in said supporting configuration.

2. The support of claim 1 comprising side flanges provided on said first leg and said second leg and pivot fasteners extending through said flanges and said first support segment and said second support segment, respectively, for pivotally connecting said first leg to said first support segment and said second leg to said second support segment, respectively.

3. The support of claim 1 wherein said first leg and said second leg are substantially equal in length.

4. The support of claim 1 wherein said first leg and said second leg are unequal in length.

5. A support for supporting a drain hose, comprising a generally trough shaped, substantially semi-cylindrical first support segment having substantially parallel first longitudinal edges; rails provided on said first longitudinal edges of said first support segment and downwardly-extending rail slots provided in said rails, respectively; a generally trough-shaped, substantially semi-cylindrical second support segment having substantially parallel second longitudinal edges slidably engaging said rail slots in said rails and selectively substantially slidably closing said second support segment inside said first support segment; a first generally trough-shaped, substantially semi-cylindrical leg pivotally connected to said first support segment for pivoting and nesting against said first support segment in folded configuration and pivotally extending from said first support segment in supporting configuration; and a second generally trough-shaped, substantially semi-cylindrical leg pivotally connected to said second support segment for pivoting and nesting against said second support segment in said folded configuration and pivotally extending from said second support segment in said supporting configuration.

6. The support of claim 5 wherein said first leg and said second leg are substantially equal in length.

7. The support of claim 5 wherein said first leg and said second leg are unequal in length.

8. The support of claim 7 comprising side flanges provided on said first leg and said second leg and pivot fasteners extending through said flanges and said first support segment and said second support segment, respectively, for pivotally connecting said first leg to said first support segment and said second leg to said second support segment, respectively.

9. A support for supporting a drain conduit or hose, comprising a generally trough-shaped first support segment having a first support segment bottom and a first pair of stepped sides extending longitudinally from said first support segment bottom for stiffening said first support segment, first longitudinal edges provided on said first pair of stepped sides, respectively, rails provided on said first longitudinal edges, respectively, and rail slots provided in said rails, respectively; a generally trough-shaped second support segment having a second support segment bottom and a second pair of stepped sides extending longitudinally from said second support segment bottom for stiffening said second support segment and second longitudinal edges provided on said second pair of stepped sides, respectively, said second longitudinal edges slidably engaging said rail slots in said rails for selectively substantially slidably closing said second support segment inside said first support segment; a first generally trough-shaped leg pivotally connected to said first support segment for pivoting and nesting against said first support segment in folded configuration and pivotally extending from said first support segment in supporting configuration, said first generally trough-shaped leg comprising a first leg bottom and a pair of stepped first leg sides extending from said first leg bottom for stiffening said first leg; and a second generally trough-shaped leg pivotally connected to said second support segment for pivoting and nesting against said second support segment in said folded configuration and pivotally extending from said second support segment in said supporting configuration, said second generally trough-shaped leg comprising a second leg bottom and a pair of stepped second leg sides extending from said second leg bottom for stiffening said second leg.

10. The support of claim 9 comprising side flanges provided on said first leg and said second leg and pivot fasteners extending through said flanges and said first support segment and said second support segment, respectively, for pivotally connecting said first leg to said first support segment and said second leg to said second support segment, respectively.

11. The support of claim 9 wherein said first leg and said second leg are substantially equal in length.

12. The support of claim 9 wherein said first leg and said second leg are unequal in length.

13. A support for supporting a drain hose, comprising a generally trough-shaped first support segment having a first support segment bottom and a first pair of stepped sides extending longitudinally from said first support segment bottom for stiffening said first support segment, substantially parallel first longitudinal edges provided on said first pair of stepped sides, respectively, rails provided on said first longitudinal edges, respectively, and downwardly-extending rail slots provided in said rails, respectively; a generally trough-shaped second support segment having a second support segment bottom and a second pair of stepped sides extending longitudinally from said second support segment bottom for stiffening said second support segment and substantially parallel second longitudinal edges provided on said second pair of stepped sides, respectively, said second longitudinal edges slidably engaging said rail slots in said rails for selectively substantially slidably closing said second support segment inside said first support segment; a first generally trough-shaped leg pivotally connected to said first support segment for pivoting and nesting against said first support segment in folded configuration and pivotally extending from said first support segment in supporting configuration, said first generally trough-shaped leg comprising a first leg bottom and a pair of stepped first leg sides extending from said first leg bottom for stiffening said first leg; and a second generally trough-shaped leg pivotally connected to said second support segment for pivoting and nesting against said second support segment in said folded configuration and pivotally extending from said second support segment in said supporting configuration, said second generally trough-shaped leg comprising a second leg bottom and a pair of stepped second leg sides extending from said second leg bottom for stiffening said second leg.

14. The support of claim 13 wherein said first leg and said second leg are substantially equal in length.

15. The support of claim 13 wherein said first leg and said second leg are unequal in length.

16. The support of claim 15 comprising side flanges provided on said first leg and said second leg and pivot fasteners extending through said flanges and said first support segment and said second support segment, respectively, for pivotally connecting said first leg to said first support segment and said second leg to said second support segment, respectively.

\* \* \* \* \*